May 31, 1938. F. H. EHNTS Re. 20,743

LUBRICATING NOZZLE

Original Filed Feb. 5, 1936

INVENTOR
Fred H. Ehnts,
BY
Fraser, Myers & Manley
ATTORNEYS.

Reissued May 31, 1938

Re. 20,743

UNITED STATES PATENT OFFICE 20,743

LUBRICATING NOZZLE

Fred. Henry Ehnts, Lansdowne, Pa.

Original No. 2,058,219, dated October 20, 1936, Serial No. 62,430, February 5, 1936. Application for reissue February 5, 1938, Serial No. 188,867

16 Claims. (Cl. 221—47.4)

My invention relates generally to greasing or lubricating apparatus and more particularly to improvements in back-pressure indicating fittings or nozzles through which grease is discharged into bearings.

One of the objects of my invention is to provide a fitting or nozzle that may be readily applied to the filling vent of a bearing housing for the purpose of filling the bearing with the required quantity of grease at a predetermined and a desirable operating pressure.

In the specialized field of bearing lubrication, the practice has been heretofore to inject the grease into a bearing under pressure without a means of ascertaining whether the pressure is adequate or excessive. Not infrequently the zealous operator in a spirit of excess caution fills the bearing with grease under too great a pressure, and thereby may unknowingly be supplying the cause of a bearing failure. It is now recognized that space must be allowed for normal expansion of grease which occurs due to speed and operating temperature, otherwise overheating of the bearing will occur. Overlubrication under high pressure may even prevent the balls or rolls in a bearing from revolving, thus causing scuffing and permanent injury to the bearing.

My invention avoids the hazards of direct pressure greasing by indicating in a visible manner when the bearing is filled with the required quantity of grease under a proper pressure.

Another object of my invention is to provide a fitting (nozzle) that will indicate to the operator any irregular or unanticipated obstruction existent in the bearing that may be caused by solidified grease or other factors. Should the bearing really require greasing and, nevertheless, the nozzle expels grease from its rear surface when the gun discharges grease into the bearing, the operator is immediately apprised of a defective condition in the bearing that may be imputable to a number of causes.

A further object of my invention is to provide a nozzle that can be readily adjusted to serve as a direct high pressure discharging nozzle to be attached to a pressure gun of either the continuous or intermittent feeding type.

For the purpose of illustrating my invention I have shown in the accompanying drawing a form thereof which has been found in practice to give satisfactory and reliable results, although it is to be understood that the various instrumentalities of which my invention consists can be variously arranged and organized and that my invention is not limited to the precise arrangement and organization of the instrumentalities as herein shown and described.

My invention relates to several other novel features of construction and advantage appearing as hereinafter described and claimed in connection with the accompanying drawing, in which:

Figure 1:
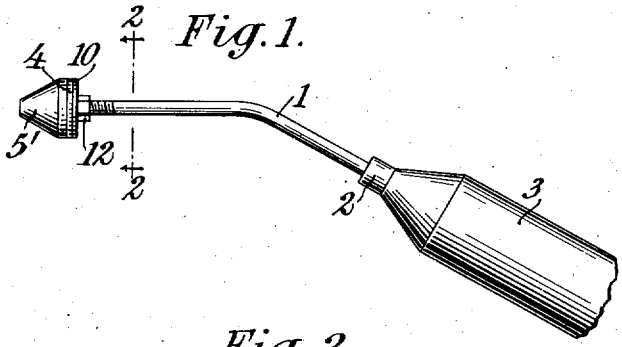
Figure 1 represents on a reduced scale the fitting or nozzle of my invention attached to a grease gun.
Figure 2:
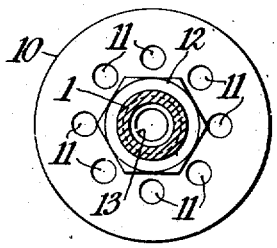
Fig. 2 represents a section taken on the plane of the line 2—2 of Fig. 1.

Referring to the drawing, in which like reference characters indicate like parts, 1 is a length of metal tubing which is attached at one end through a universal joint 2 to a metering or measuring grease gun 3. At the other end the tube 1 engages threadedly with the cap 4 which threadedly engages with the orifice element 5'. The cap 4 is perforated with a plurality of holes 5, constant in diameter and distributed uniformly on a circumference concentric with the external periphery of the cap 4. The orifice element 5' approximates in shape and contour a truncated hollow cone with its smaller opening 6 adapted to enter for a short distance the filling vent 7 of the bearing housing 8. The base or the larger opening 9 of the orifice element 5' is threaded to engage the cap 4. Over the tube 1 and bearing on the cap 4 is the perforated washer 10, the holes 11 of which are distributed on a circumference that coincides with a similar circumference on the cap 4 but the diameters of which vary slightly between close limits. The washer 10 can be rotated freely about the tube 1 and, accordingly, can be set in indefinite number of positions relatively to the perforations in the cap 4, ranging from a position in which all of the perforations are closed to a position in which all of the aforesaid perforations are open. The lock nut 12 threaded to engage the tube 1 serves to hold securely the washer 10 in any predetermined relationship with the cap 4.

A thin walled cylindrical tube 13 is fitted snugly into the smooth bore of the threaded end of the tube 1 and is adjustable in that its end 14 can be advanced toward or withdrawn from the smaller end of the orifice element 5' to thereby vary the restricted opening between the end 14 of the tube 13 and the enclosing wall of the orifice element 5'. If the distance A is decreased, then the area of the restricted opening above referred to is decreased and the pressure at which the grease will be expelled from the bearing 8 is increased; and if the distance A is increased, then the area of the restricted opening is increased and the pressure at which grease will be expelled from the bearing will be decreased.

The area of the restricted opening between the end 14 of the tube 13 and the wall of the orifice element adjacent the discharge end thereof determines the pressure at which the grease in the bearing will back up and be expelled through the openings 5 in the cap 4 and thereby provide a telltale or indication that the bearing has an adequate amount of grease therein.

Figure 3:
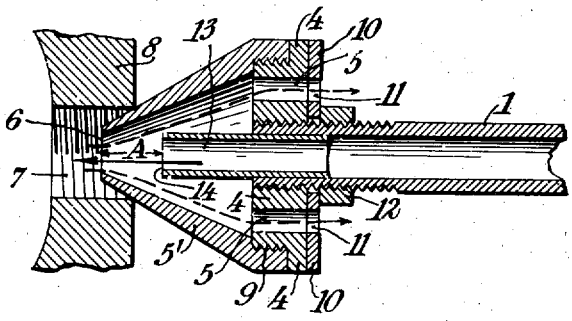
Fig. 3 represents an axial sectional view through the fitting shown in Fig. 1.

The manner in which my device can be utilized becomes obvious when its operation is more fully described. The grease gun 3 is of the metering or measuring type and with every release of its trigger a definite quantity of grease, approximately .07 oz., is discharged, as indicated by the solid arrow, through the orifice element opening 6 into the filling vent 7 of the bearing 8. For lubricating a bearing where excessive pressure is to be avoided, the washer 10 is rotated to such a degree that its holes 11 coincide with the perforations 5 of the cap 4, thus affording a plurality of unobstructed passageways throughout the enlarged end of the nozzle and adjusting the restrictive opening adjacent the discharge end of the nozzle to establish a predetermined low pressure for the grease in the bearings. When a sufficient quantity of grease has been admitted to the bearing 8 and the pressure therein builds up to exceed that governed by the restrictive opening, then the excess greas is expelled along the paths indicated by the broken arrows of Fig. 3 through the perforations 5 and 11, indicating immediately to the operator that the bearing 8 has been correctly and adequately greased. Experience has determined that a pressure of 1.5 to 3 ounces upon the grease in a bearing is ample for most purposes. The universal joint 2 attaching the nozzle to the gun 3 enables the operator to apply grease to bearings that are situated in awkward or comparatively inaccessible places.

Should the operator desire, he can quickly release the lock nut 12, rotate the washer 10 in such a manner that the perforations 5 are closed, and proceed to use the nozzle on any type of grease gun as an ordinary high pressure fitting.

What I claim is:

1. A nozzle comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube.

2. A nozzle adaptable to a metering gun comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube.

3. A nozzle adaptable to a metering gun serving the function of indicating excessive pressure of grease in a bearing lubricated by the said metering gun and comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube.

4. A nozzle adaptable to a pressure gun comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube and to close said perforated cap.

5. A lubricating fitting comprising a member having an intake opening adapted for engagement with a lubricant supply means, a discharge opening adapted for engagement with a member for receiving lubricant under pressure, and an unobstructed opening extending from a point adjacent the discharge opening rearwardly through the wall of the member to the exterior thereof.

6. A lubricating fitting comprising a member having a passage therethrough and a housing enclosing said member adapted for engagement with a member for receiving lubricant under pressure through said passage, said housing having an unobstructed opening through the wall thereof rearwardly of the discharge passage therein normally establishing communication between the discharge end of said passage and the exterior of the housing when the fitting is in lubricant supplying relation to the lubricant receiving member.

7. A lubricant fitting comprising a member having a passage therethrough and a housing enclosing said member adapted for engagement with a member for receiving lubricant under pressure through said passage, said housing having a chamber surrounding the discharge end of said passage and being in open communication therewith, and an opening through a wall of the housing rearwardly of the discharge end thereof leading from the chamber to the exterior of the housing.

8. A fitting of the type described, comprising a casing having receiving means for engagement with a source of viscous material, means for engagement with a member for receiving the viscous material upon discharge from the casing under pressure, the casing having an opening through the wall thereof rearwardly of the discharge passage therein providing open communication between the interior of the casing and the exterior thereof for permitting the escape of viscous material from the casing when the pressure of the viscous material in the receiving member exceeds a predetermined pressure.

9. A fitting of the type described, comprising a casing having receiving means for engagement with a source of viscous material, a tubular element within said casing in open communication with said receiving means, the discharge end of said tubular element being in spaced relation to the discharge end of the casing, means for engagement of the casing with a member for receiving the viscous material upon discharge from the fitting under pressure, and said casing having an opening through a wall thereof rearwardly of the discharge end of the tubular element providing open communication between the interior of the casing and the exterior thereof adapted to permit the escape of viscous material therethrough from the casing when the pressure of said viscous material in the receiving chamber exceeds a predetermined pressure.

10. A fitting of the type described, comprising a casing having receiving means for engagement with a source of viscous material, a tubular element within said casing in open communication with said receiving means, the discharge end of said tubular element terminating rearwardly of, and in axially spaced relation to, the discharge end of the casing, means for engagement of the casing with a member for receiving the viscous material upon discharge from the fitting under pressure, and said casing having an opening through a wall thereof rearwardly of the discharge end of the tubular element providing open communication between the interior of the casing and the exterior thereof for permitting the escape of viscous material therethrough from the casing when the pressure of said viscous material in the receiving chamber exceeds a predetermined pressure.

11. A fitting of the type described, comprising a casing having receiving means for engagement with a source of viscous material, a tubular element within said casing in open communication with said receiving means, the discharge end of said tubular element being in spaced relation to the discharge end of the casing and being adjustable with relation thereto to vary the radial distance between the opposed walls thereof, means for engagement with a member for receiving the viscous material upon discharge from the casing under pressure, and said casing having an opening therein providing open communication between the interior of the casing and the exterior thereof.

12. A fitting of the type described, comprising a casing having receiving means for engagement with a source of viscous material, a tubular element within said casing in open communication with said receiving means, the discharge end of said tubular element being in spaced relation to the discharge end of the casing, one of the opposed walls on the tubular element and on the casing at the discharge end of the fitting being of substantially conical form, and the tubular element being axially adjustable with relation to the casing to vary the radial distance between said opposed walls adjacent the discharge end of the casing, means for engagement of the casing with a member for receiving the viscous material upon discharge from the casing under pressure, and said casing having an opening therein rearwardly of the discharge end thereof providing open communication between the interior of the casing and the exterior of the casing.

13. A telltale fitting for indicating when viscous lubricant supplied to a bearing has reached a predetermined pressure therein, comprising a hollow casing having a discharge end adapted for engagement with the housing of the bearing to be lubricated, a tubular element within said casing, one end of said tubular element being adapted for connection with a source of lubricant and the other end being in spaced relation to the discharge end of the casing and providing therewith a restricted opening between the opposed walls of said members adjacent said discharge end, and the casing having an opening through a wall thereof rearwardly of said discharge end of the tubular element providing open communication between the restricted opening at the opposed walls and the exterior of the casing.

14. A fitting of the type described, comprising a casing having receiving means for engagement with a source of viscous material, a tubular element within said casing in open communication with said receiving means, the discharge end of said tubular element terminating in proximity to the discharge end of the casing and being in radially spaced relation to that portion of the casing which is in proximity to said discharge end of the tubular element, said tubular element being axially adjustable to vary the distance between the discharge end thereof and the discharge end of the casing, means for engagement with a member for receiving the viscous material upon discharge from the casing under pressure, and said casing having an opening therein providing open communication between the interior of the casing and the exterior thereof.

15. A telltale fitting for indicating when viscous lubricant supplied to a bearing has reached a predetermined pressure therein, comprising a hollow casing having a discharge end adapted for engagement with the housing of the bearing to be lubricated, a tubular element within said casing, one end of said tubular element being adapted for connection with a source of lubricant and the other end being in spaced relation to the discharge end of the casing and providing therewith a restricted opening between the opposed walls of said members adjacent said discharge end, the casing having an opening through a wall thereof rearwardly of said discharge end of the tubular element providing open communication between the restricted opening at the opposed walls and the exterior of the casing, and a member having an opening therein for adjustable registry with the opening in the wall of the casing to vary the effective area of said last-mentioned opening.

16. A telltale fitting for indicating when viscous lubricant supplied to a receiving chamber has reached a predetermined pressure therein, comprising a hollow casing having means for engagement with a source of viscous material and having a discharge end adapted for engagement with the receiving chamber to be lubricated, a tubular element within said casing adapted to receive viscous material from a source under pressure and discharge it into the receiving chamber, the discharge end of said tubular element being in spaced relation to the discharge end of the casing, which latter provides a chamber around the tubular element adapted to receive a back-flow of viscous material thereinto when the back pressure built up by the viscous material being charged into the receiving chamber exceeds a predetermined value, and said casing being formed to provide a visual indication when the back-flow of viscous material into the chamber thereof takes place.

FRED. HENRY EHNTS.